(12) United States Patent
Liu et al.

(10) Patent No.: US 11,702,104 B2
(45) Date of Patent: Jul. 18, 2023

(54) SYSTEMS AND METHODS TO DETERMINE RISK DISTRIBUTION BASED ON SENSOR COVERAGES OF A SENSOR SYSTEM FOR AN AUTONOMOUS DRIVING VEHICLE

(71) Applicant: Baidu USA LLC, Sunnyvale, CA (US)

(72) Inventors: Xiaodong Liu, San Jose, CA (US); Ning Qu, Fremont, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 200 days.

(21) Appl. No.: 16/855,283

(22) Filed: Apr. 22, 2020

(65) Prior Publication Data
US 2021/0331700 A1 Oct. 28, 2021

(51) Int. Cl.
*B60W 60/00* (2020.01)
*G06V 20/56* (2022.01)

(52) U.S. Cl.
CPC .... *B60W 60/0015* (2020.02); *B60W 60/0011* (2020.02); *B60W 60/0025* (2020.02); *G06V 20/56* (2022.01)

(58) Field of Classification Search
CPC ......... B60W 60/0015; B60W 60/0025; B60W 60/0011; B60W 2050/0215; B60W 50/023; B60W 50/0225; B60W 50/029; B60W 50/0292; G06V 20/56; G05D 1/0214
See application file for complete search history.

(56) References Cited

U.S. PATENT DOCUMENTS

| | | | |
|---|---|---|---|
| 10,551,838 | B2 | 2/2020 | Liu et al. |
| 10,558,897 | B2 * | 2/2020 | Sharma ............... G06K 9/6292 |
| 11,199,379 | B1 * | 12/2021 | Lam ..................... F41G 7/2253 |
| 2018/0232947 | A1 * | 8/2018 | Nehmadi ............... G01S 7/295 |
| 2018/0370540 | A1 * | 12/2018 | Yousuf ............... G06F 11/1487 |
| 2019/0180521 | A1 * | 6/2019 | Miller ................... B60W 10/20 |
| 2020/0039531 | A1 * | 2/2020 | Fushimi ................ G01S 17/86 |

(Continued)

FOREIGN PATENT DOCUMENTS

GB 2576206 2/2020

OTHER PUBLICATIONS

Jeremy Jones, "The Multiplication Rule of Probability" Apr. 8, 2019, stayorswitch.com (Year: 2019).*

(Continued)

*Primary Examiner* — Adam R Mott
*Assistant Examiner* — Erick T. Detweiler
(74) *Attorney, Agent, or Firm* — Womble Bond Dickinson (US) LLP

(57) ABSTRACT

Systems and methods of determining a risk distribution associated with a multiplicity of coverage zones covered by a multiplicity of sensors of an autonomous driving vehicle (ADV) are disclosed. The method includes for each coverage zone covered by at least one sensor of the ADV, obtaining MTBF data of the sensor(s) covering the coverage zone. The method further includes determining a mean time between failure (MTBF) of the coverage zone based on the MTBF data of the sensor(s). The method further includes computing a performance risk associated with the coverage zone based on the determined MTBF of the coverage zone. The method further includes determining a risk distribution based on the computed performance risks associated with the multiplicity of coverage zones.

17 Claims, 11 Drawing Sheets

(56) References Cited

U.S. PATENT DOCUMENTS

2020/0180632 A1* 6/2020 Morita ................ B60W 10/18
2020/0180653 A1* 6/2020 Chi ...................... B60W 10/04
2020/0207362 A1* 7/2020 Nishida ............... B60W 50/032

OTHER PUBLICATIONS

A. Strasser, P. Stelzer, C. Steger and N. Druml, "Enabling Live State-of-Health Monitoring for a Safety-Critical Automotive LiDAR System," 2020 IEEE Sensors Applications Symposium (SAS), 2020, pp. 1-6.
Shin, J., and Lee, I. (Jun. 2, 2014). "Reliability-Based Vehicle Safety Assessment and Design Optimization of Roadway Radius and Speed Limit in Windy Environments." ASME. J. Mech. Des. Aug. 2014 (10 pages).

* cited by examiner

SYSTEMS AND METHODS TO DETERMINE RISK DISTRIBUTION BASED ON SENSOR COVERAGES OF A SENSOR SYSTEM FOR AN AUTONOMOUS DRIVING VEHICLE

TECHNICAL FIELD

Embodiments of the present disclosure relate generally to operating autonomous vehicles. More particularly, embodiments of the disclosure relate to systems and methods to determine a risk distribution based on sensor coverages of a sensor system for an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

The safety of an autonomous driving system has gained increasing attention since SAE (Society of Automotive Engineers) Level 4 (L4) autonomous vehicles experience a key milestone by transitioning from POC (proof of concept) to production. Common industry approaches are to design such system with redundancy and diversification from sensors, hardware, software, etc. ISO 26262, namely functional safety, can be adequately used to quantically address an autonomous driving system's risks from its internal random hardware failure and systematic software failure. However, a method has yet to be developed for quantically estimating the autonomous driving system's risks due to its performance limitation when deployed in a geofenced operational design domain (ODD).

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
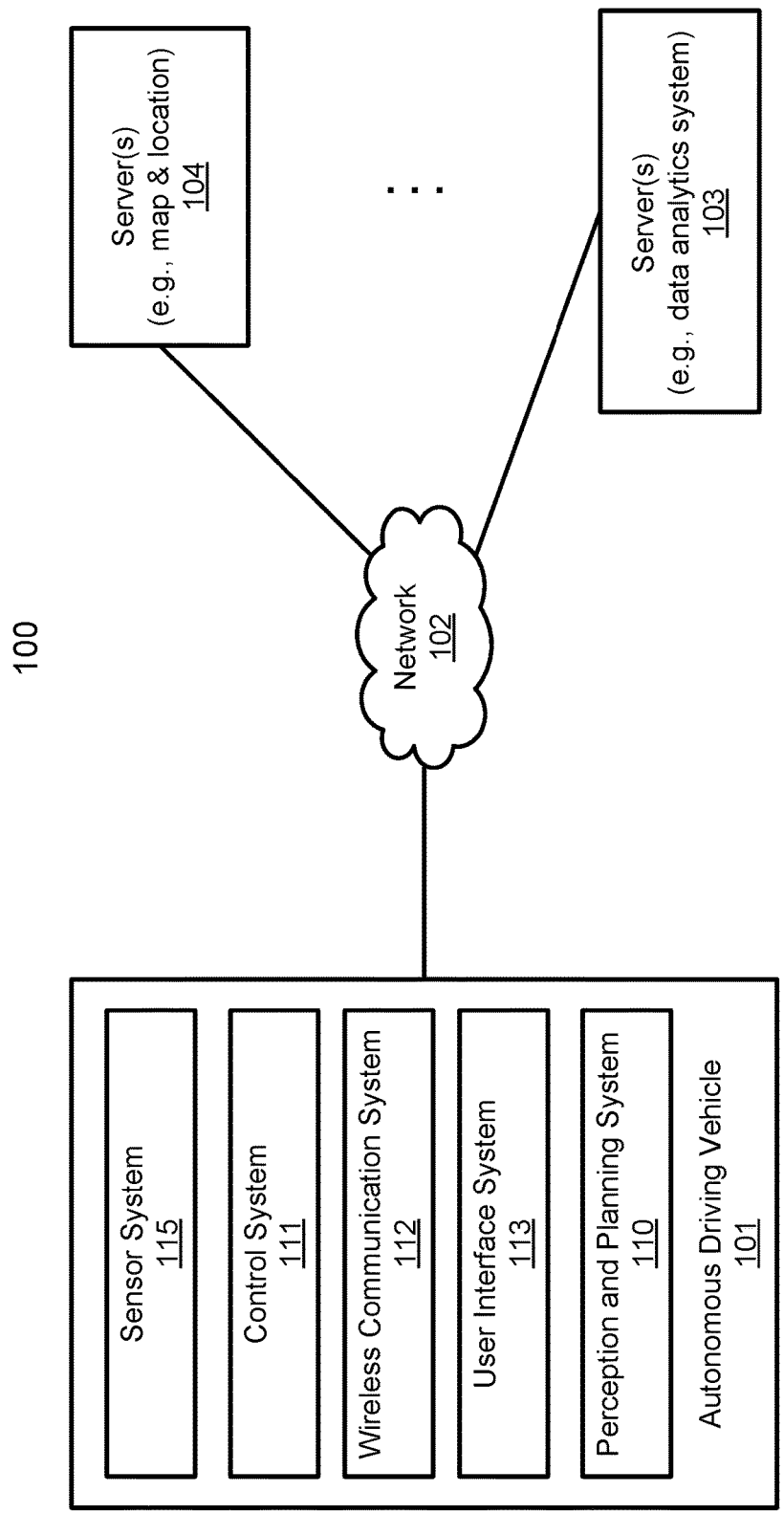
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a safety redundancy autonomous driving system (ADS) is disclosed. The system may include a defined system capability of performance oriented primary ADS for dynamic driving task (DDT) and a safety focused backup ADS for DDT fallback. The system may be used to demonstrate as to how sensor system risks can be determined from individual sensor performance's MTBF (mean time between failure).

In one aspect, a method of determining a risk distribution associated with coverage zones covered by sensors of an autonomous driving vehicle (ADV) is described. The method includes for each coverage zone covered by at least one sensor of the ADV, obtaining MTBF data of the sensor(s) covering the coverage zone. The method further includes determining a mean time between failure (MTBF) of the coverage zone based on the MTBF data of the sensor(s). The method further includes computing a performance risk associated with the coverage zone based on the determined MTBF of the coverage zone. The method further includes determining a risk distribution based on the computed performance risks associated with the plurality of coverage zones.

In one embodiment, the method further includes determining whether the ADV is operating in autonomous driving (AD) mode. In response to determining that the ADV is operating in the AD mode, the method further includes starting an AD mode timer. The method further includes determining whether the AD mode timer reaches the MTBF of the coverage zone. The method further includes determining whether the MTBF of the coverage zone has timed out. In response to determining that the MTBF of the coverage zone has timed out, the method further includes monitoring performance limitation of the sensor(s) within the coverage zone.

In one embodiment, the method further includes determining whether the performance limitation of the sensor(s) is detected. In response to determining that the performance limitation of the sensor(s) is detected, the method further includes determining whether the performance limitation is permanent. In response to determining that the performance limitation is permanent, the method further includes marking the coverage zone as invalid. Otherwise, in response to determining that the performance limitation is not permanent, the method further includes marking the coverage zone as valid.

In one embodiment, the performance risk associated with the coverage zone is a reciprocal of the MTBF of the coverage zone. In one embodiment, the sensor(s) may include at least one of: a primary sensor communicating with a primary autonomous driving system (ADS) of the ADV, a redundant sensor communicating with a secondary ADS of the ADV, or a shared sensor communicating with the primary ADS and the secondary ADS. In another embodiment, the sensor(s) may include a first sensor and a second sensor, and the MTBF of the coverage zone is a product of a MTBF of the first sensor and a MTBF of the second sensor, assuming that first sensor and second sensor do not fail or undergo limitation at the same time.

In one embodiment, the sensor(s) includes a 360-degree light detection and range (LIDAR) unit, a multiplicity of cameras, a multiplicity of side LIDAR units, a forward facing radar unit, a rear facing radar unit, and a redundant forward facing LIDAR unit. The cameras and the 360-degree LIDAR unit may only be used by a primary autonomous driving system (ADS) of the ADV. The side LIDAR units and the forward and rear facing radar units may be shared between the primary ADS and a secondary ADS of the ADV. The redundant forward facing LIDAR unit may only be used by the secondary ADS.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
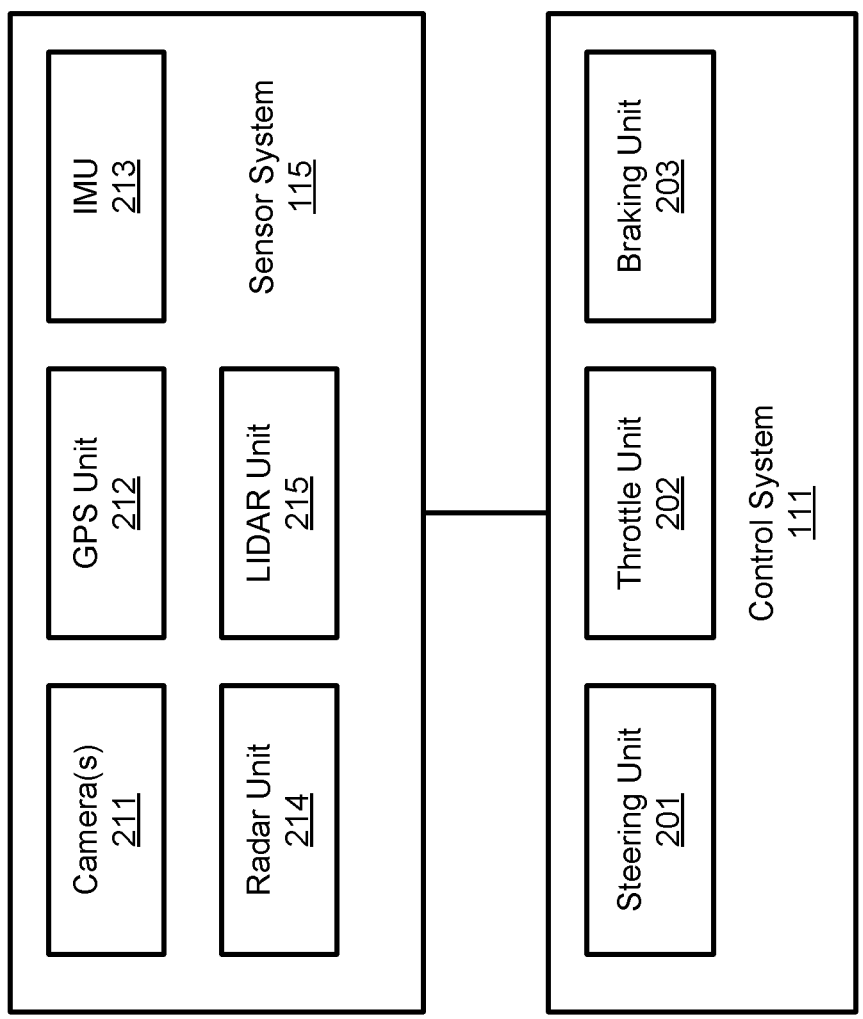
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Figure 3A:
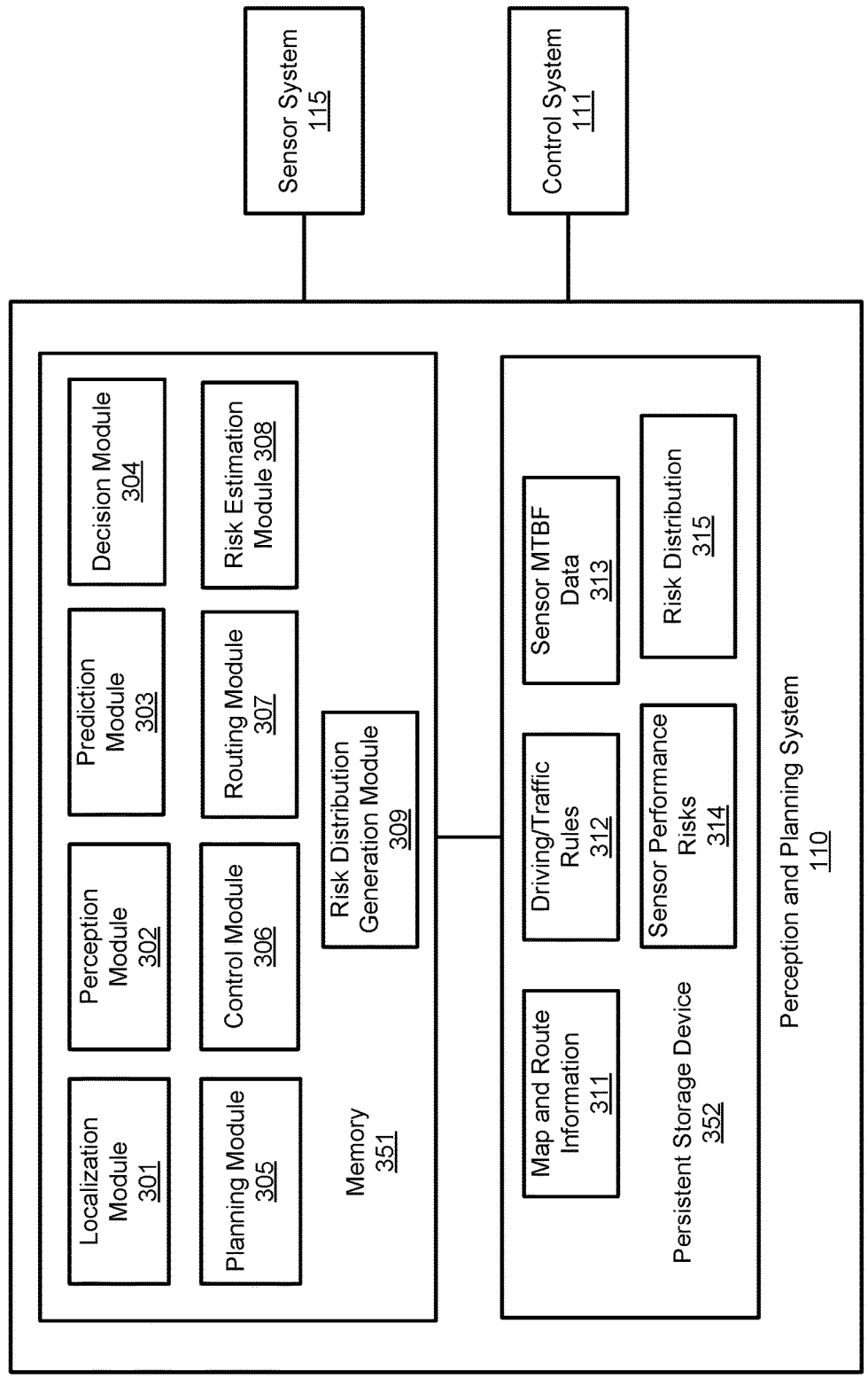
FIGS. 3A-3B are block diagrams illustrating an example of a perception and planning system used with an autonomous vehicle according to one embodiment.
Figure 3B:
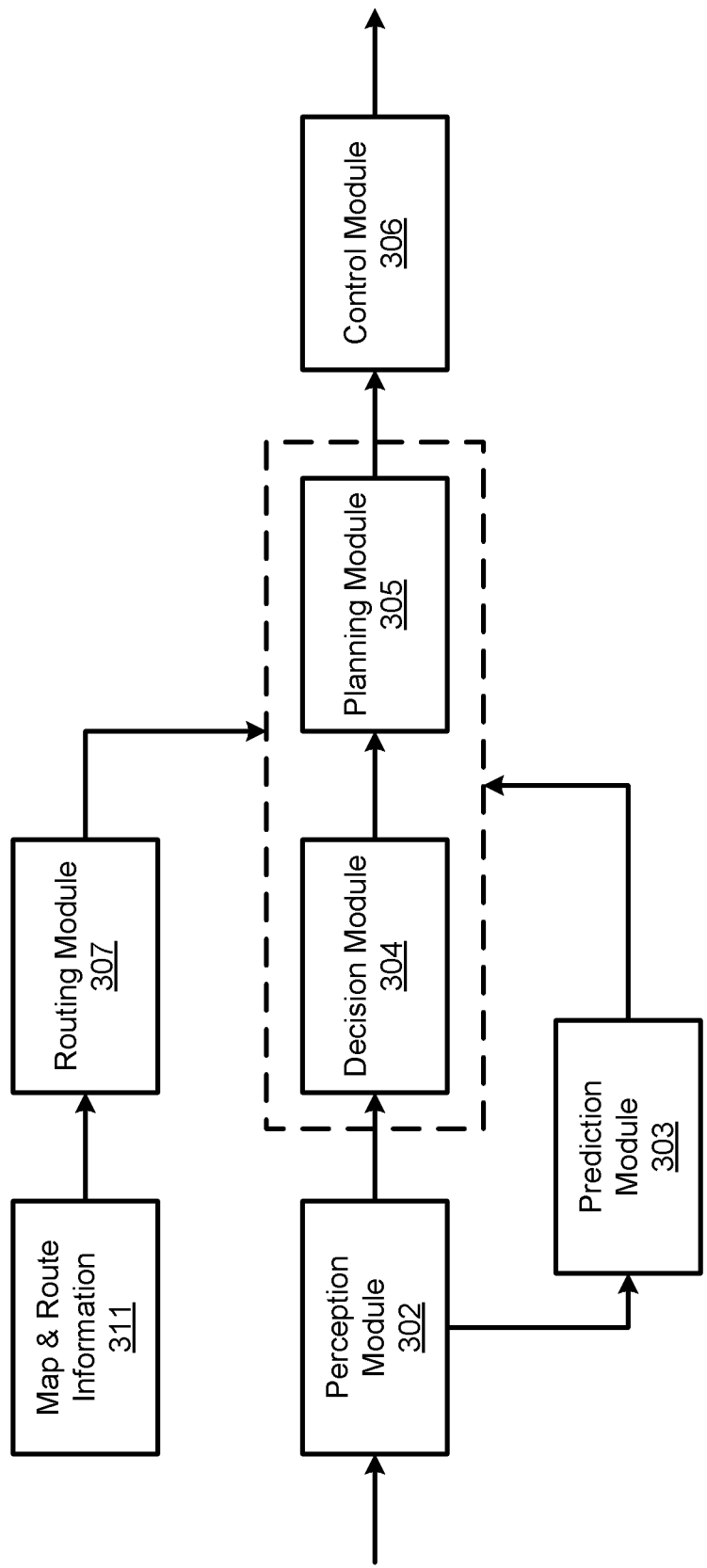

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, risk estimation module 308, and risk distribution generation module 309.

Some or all of modules 301-309 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-309 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

With continued reference to FIG. 3A, sensor MTBF data 313 may include MTBF information of each sensor within sensor system 115 (e.g., camera(s) 211, radar unit 214, LIDAR 215, a sonar sensor, an infrared sensor, etc.). In one embodiment, sensor MTBF data 313 may be predetermined and preloaded into persistent storage device 352. Based on sensor MTBF data 313, risk estimation module 308 may evaluate the risk tolerance of autonomous driving vehicle 101. That is, during operation of vehicle 101 in autonomous driving (AD) mode, module 308 may continuously estimate performance risks associated with sensor system 115 in real-time prior to sensor system 115 reaching its MTBF. For example, for each sensor within sensor system 115, module 308 may quantically express a performance risk associated with the sensor as (1/MTBF). MTBF refers to an elapsed time between failures of sensor system 115 (or a sensor within system 115) during operation of sensor system 115 (or the sensor within system 115). MTBF may be measured in hour, minute, second, or any suitable metric unit. The estimated performance risks may be stored as part of sensor performance risks 314 in persistent storage device 352.

Based on the sensors' estimated performance risks, risk distribution generation module 309 may generate a risk distribution 315 (which may be stored in persistent storage device 352 or on a remote server, such as server 103/104) over a time period while vehicle 101 is moving along a route in AD mode. For example, module 309 may compute performance risks associated with different coverage zones covered by the sensors using the sensors' estimated performance risks. The computed zone associated risks may be used to generate risk distribution 315, which can be updated in real-time while vehicle 101 operates in AD mode. Aspects as related to risk distribution 315 are described in more detail herein below with respect to FIG. 5B.

Figure 4:
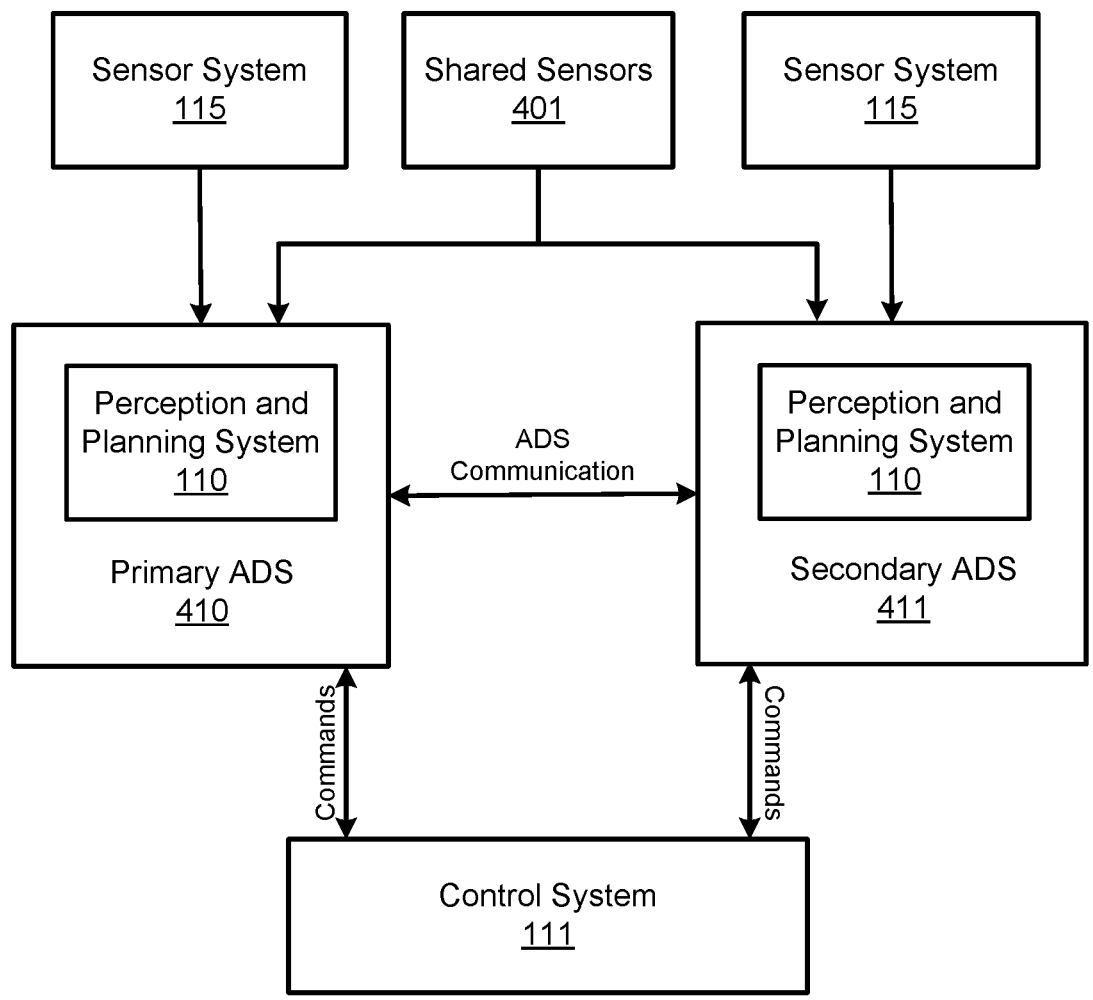
FIG. 4 is a block diagram illustrating an example of a safety redundancy autonomous driving system according to one embodiment.

FIG. 4 is a block diagram illustrating an example of a safety redundancy ADS according to one embodiment.

Referring to FIG. 4, in some embodiments, autonomous driving vehicle 101 may include a safety redundancy ADS 400 installed thereon. As shown, system 400 includes a primary ADS 410 (also referred to as DDT system) and a secondary ADS 411 (also referred to as backup or DDT fallback system), with each system including a perception and planning system 110 (as previously described). In one embodiment, primary ADS 410 is configured to ensure the overall system performance, while secondary ADS 411 is configured to focus on diversified safety assurance.

In one embodiment, perception and planning system 110 of the primary ADS 410 may receive sensor data from first sensor system 115 (which may include primary sensors, such as cameras, radar units, LIDAR units, etc.), and perception and planning system 110 of the secondary ADS 411 may receive sensor data from second sensor system 115 (which may include redundant sensors, such as cameras, radar units, LIDAR units, etc.). As shown, the perception and planning systems of the primary ADS 410 and secondary ADS 411 may also receive sensor data from shared sensors 401 (e.g., cameras, radar units, LIDAR units, etc.). Based on the sensor data from first and second systems 115 and shared sensors 401, primary ADS 410 and secondary ADS 411 may communicate with each other internally to drive vehicle 101 by sending commands or signals, such as motion actuator commands, to control system 111. Aspects of systems 110, 111 and 115 have been previously described, and for brevity sake, will not be described again.

Figure 5A:
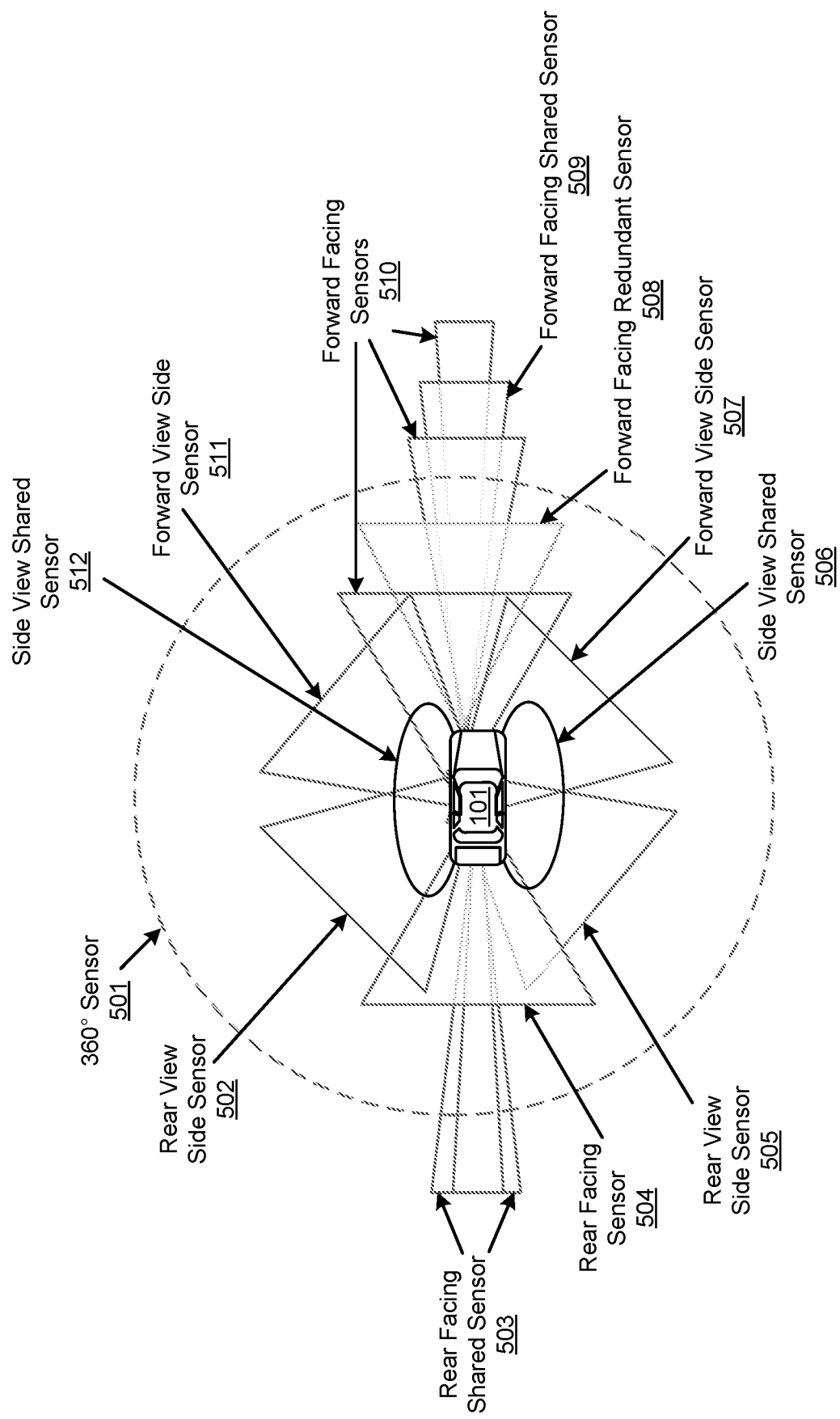
FIG. 5A is a diagram illustrating an example of a sensor system layout of an autonomous driving vehicle according to one embodiment.

FIG. 5A is a diagram illustrating an example of a sensor system layout of an autonomous driving vehicle according to one embodiment. Referring to FIG. 5A, autonomous driving vehicle 101 may include one or more sensor systems (e.g., first sensor system 115 associated with system 410, second sensor system 115 associated with system 411, and shared sensors 401 of FIG. 4) installed thereon. In the sensor system layout of vehicle 101 shown in FIG. 5A, cameras and 360 degrees LIDAR unit may be solely used by primary ADS 410, side LIDAR units and forward/rear facing radar units may be shared between primary ADS 410 and second ADS 411, and redundant forward-facing LIDAR units may only be used by secondary ADS 411. As an example, vehicle 101 may include a 360-degree sensor (e.g., 360° LIDAR unit from first sensor system 115) that covers zone 501. Zone 502 may be covered by a rear view side sensor (e.g., rear view side camera from first sensor system 115), zone 503 may be covered by a rear facing shared sensor (e.g., shared radar unit from shared sensors 401), zone 504 may be covered by a rear facing sensor (e.g., rear facing camera from first sensor system 115), zone 505 may be covered by a rear view side sensor (e.g., rear view side camera from first sensor system 115), zone 506 may be covered by a side view shared sensor (e.g., side view shared LIDAR unit from shared sensors 401), zone 507 may be covered by a forward view side sensor (e.g., forward view side camera from first sensor system 115), zone 508 may be covered by a forward facing redundant sensor (e.g., forward facing redundant LIDAR unit from second sensor system 115), zone 509 may be covered by a forward facing shared sensor (e.g., forward facing shared radar unit from shared sensors 401), zone 510 may be covered by forwarding facing sensors (e.g., forward facing cameras from first sensor system 115), zone 511 may be covered by a forward view side sensor (e.g., forward view side camera from first sensor system 115), and zone 512 may be covered by a side view shared sensor (e.g., side view shared LIDAR unit from shared sensors 401).

The foregoing sensor system layout of FIG. 5A demonstrates both redundancy and diversification to a certain degree. However, to safely deploy a SAE L4 autonomous driving vehicle with such safety redundancy ADS, understanding a risk distribution around the autonomous vehicle becomes critically important. As previously described, MTBF can be used to derive the risk associated with individual sensor and its algorithm. The failures associated with the MTBFs, however, are not from the ADS internal hardware faults. Rather, the failures are from the performance limitations of the sensors when exposed to the ODD, and such performance limitations can be either permanent or temporary. Each sensor (along with its respective algorithm for interpreting sensor data) has its respective MTBF to describe its performance. As previously described, prior to reaching its MTBF, each sensor has an associated performance risk which can be quantically expressed as (1/MTBF). When the MTBF is reached, the sensor may experience a failure or limitation, which can be either permanent or temporary. Without additional safety measures, it can be very difficult to differentiate between a temporary failure and a permanent failure. Therefore, continuous use of the sensor system from that point onward can have a high risk of single point failure. Similarly, if a coverage zone (or area) is covered by two sensors, e.g., sensor A and sensor B, a combined MTBF can be computed as MTBF(Combined)=MTBF(A)*MTBF(B). Thus, a combined performance risk can be computed as 1/(MTBF(A)*MTBF(B)). Beyond the MTBF(Combined), a single point failure may occur if no additional safety measure is taken.

Figure 5B:
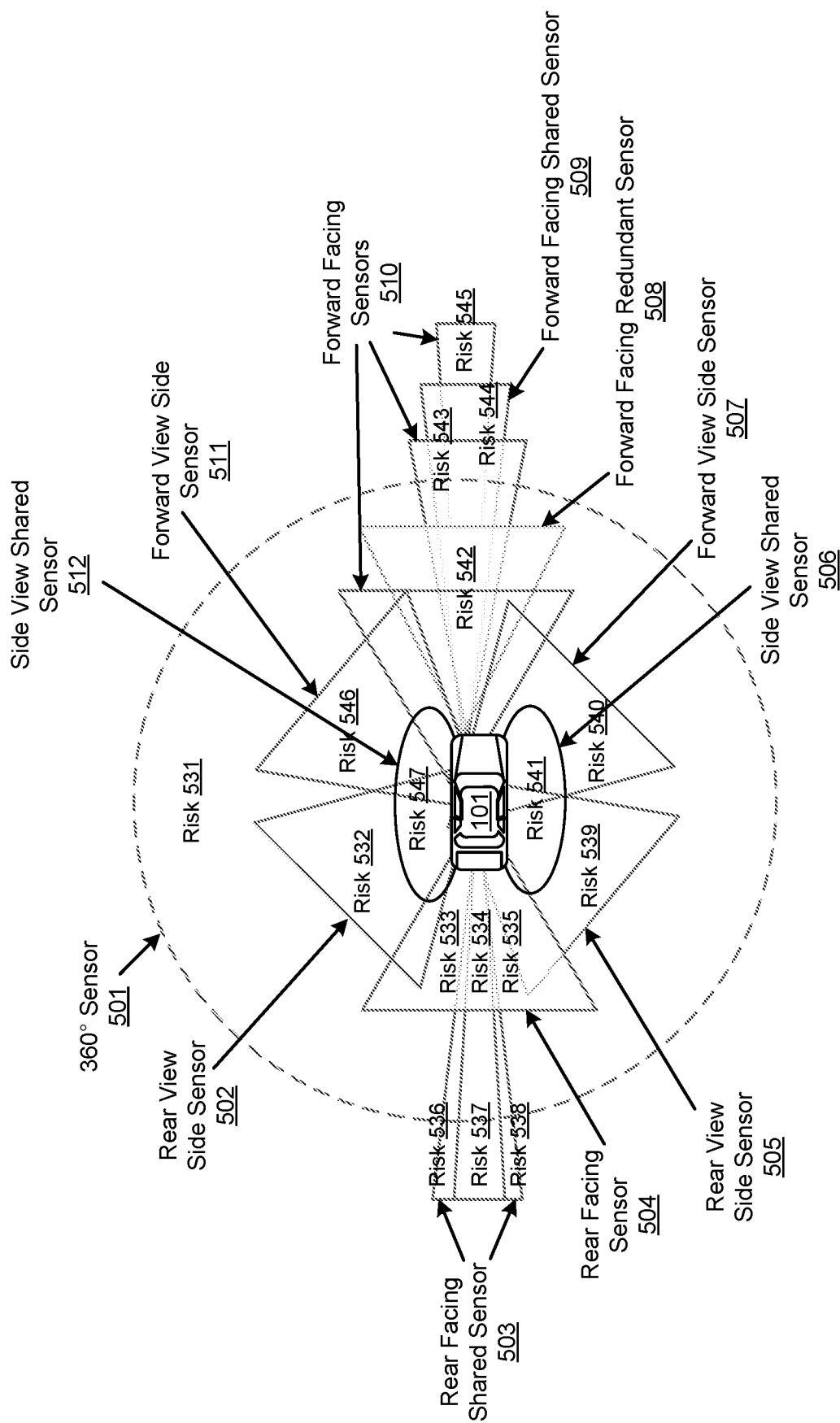
FIG. 5B is a diagram illustrating an example of a mapped risk distribution associated with the sensor system layout according to one embodiment.

FIG. 5B is a diagram illustrating an example of a mapped risk distribution associated with the sensor system layout of FIG. 5A according to one embodiment. As shown, in the risk distribution, each of coverage zones 501-512 is associated with one or more performance risks (which may include combined performance risks). For example, coverage zone 501 is associated with performance risk 531, which may be the performance risk of a 360° LIDAR unit. As such, risk 531 can be represented as $10^{-l}$, where l is the first letter of LIDAR in lower case. Similarly, zone 502 is associated with performance risk 532 and since zone 502 is cover by both the 360° sensor and rear view side sensor, risk 532 can be represented as $(10^{-c} \times 10^{-l})$, where c is the first letter of camera in lower case.

Coverage zone 503 can be divided into three subsections. A first subsection of zone 503 is associated with risk 536, which is may be the performance risk of the rear facing shared sensor communicating with primary ADS 410. Thus, risk 536 can be represented as $10^{-r}$. A second subsection of zone 503 is associated with risk 537, which may be a combined performance risk of the rear facing shared sensor communicating with both primary ADS 410 and secondary ADS 411. Thus, risk 537 can be represented as $10^{-2r}$, where r is the first letter of RADAR in lower case. Similar to the first subsection, a third subsection of zone 503 is associated with risk 538, which may be the performance risk of the rear facing shared sensor communicating with primary ADS 410. Thus, risk 538 can also be represented as $10^{-r}$.

Coverage zone 504 can also be divided into three subsections. For example, a first subsection of zone 504 is associated with risk 533, which may be a combined performance risk of the rear facing sensor (e.g., camera) and the 360° sensor (e.g., LIDAR unit). Therefore, risk 533 can be represented as $(10^{-c} \times 10^{-l})$. A second subsection of zone 504 is associated with risk 534, which may be a combined risk of the rear facing sensor, the 360° sensor, and the rear facing shared sensor. As such, risk 534 can be represented as $(10^{-c} \times 10^{-l} \times 10^{-r})$. A third subsection of zone 504 is associated with risk 535, which may be a combined risk of the rear facing sensor and the side view shared sensor (e.g., LIDAR unit). Risk 535 therefore can also be represented as ($10^{-c} \times 10^{-l}$).

Coverage zone 505 is associated with performance risk 539, which may be a combined performance risk of the rear view side sensor (e.g., camera) and the side view shared sensor (e.g., LIDAR unit). Risk 539 therefore can also be represented as ($10^{-c} \times 10^{-l}$). Zone 506 is associated with risk 541, which may be a combined performance risk of (i) the side view shared sensor and (ii) either the rear view side sensor or the forward view side sensor. Thus, risk 541 can be represented as ($10^{-c} \times 10^{-l}$). Coverage zone 507 is associated with risk 540, which may be a combined performance risk of the forward view side sensor and the side view shared sensor. Risk 540 therefore can be represented as ($10^{-c} \times 10^{-l}$).

Coverage zone 508 is associate with risk 542, which may be a combined risk of (i) the forward facing redundant sensor (e.g., LIDAR unit), (ii) two forwarding facing sensors (e.g., cameras), (iii) a side view shared sensor (e.g., LIDAR unit), and (iv) the forward facing shared sensor (e.g., radar unit). Risk 542 therefore can be represented as ($10^{-2c} \times 10^{-r} \times 10^{-2l}$).

Coverage zone 509 may be split into two subsections. A first subsection of zone 509 may be associated with risk 543, which may be a combined performance risk of (i) two forward facing sensors (e.g., cameras) and (ii) the forward facing shared sensor (e.g., radar unit). Risk 543 therefore can be represented as ($10^{-2c} \times 10^{-r}$). A second subsection of zone 509 may be associated with risk 544, which may be a combined performance risk of a forward facing sensor (e.g., camera) and the forward facing shared sensor (e.g., radar unit). Risk 544 therefore can be represented as ($10^{-c} \times 10^{-r}$).

An outermost zone 510 is associated with risk 545, which may be the performance risk of a forward facing sensor (e.g., camera). Therefore, risk 545 may be represented as $10^{-c}$. Coverage zone 511 is associated with risk 546, which may be a combined performance risk of the forward view side sensor (e.g., camera) and the side view shared sensor (e.g., LIDAR unit). Thus, risk 546 can be represented as ($10^{-c} \times 10^{-l}$). Coverage zone 512 is associated with risk 547, which may be a combined performance risk of (i) the side view shared sensor (e.g., LIDAR unit) and (ii) either the rear view side sensor (e.g., camera) or the forward view side sensor (e.g., camera). Thus, risk 547 can also be represented as ($10^{-c} \times 10^{-l}$). It is noted that while not shown in FIG. 5B, the risk distribution may also include performance risks that are adequate (e.g., without resulting in a single point failure) within a timespan.

Herein, c, r and l from the equations previously described are integer values greater than or equal to 0. As an example, if the MTBF of a sensor (e.g., camera, LIDAR unit, radar unit) is measured in hour and the sensor has an ODD operation time of 1,000 hours, then c (designated for camera), r (designated for radar unit), or l (designated for LIDAR unit) would be equal to 3.

Figure 6:
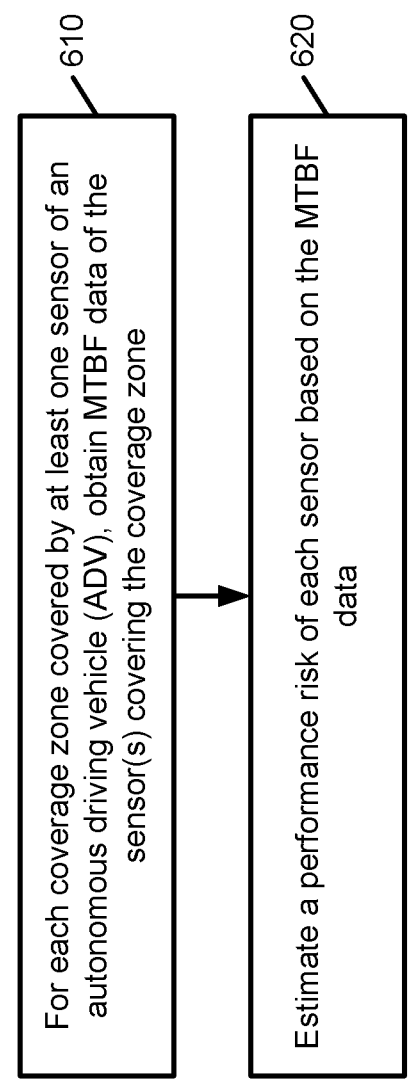
FIG. 6 is a flowchart illustrating an example method of risk estimation according to one embodiment.

FIG. 6 is a flowchart illustrating an example method of risk estimation according to one embodiment. Method 600 may be performed by hardware, software, or a combination of both. For example, method 600 may be performed by risk estimation module 308 of FIG. 3A.

Referring to FIG. 6, at block 610, for each cover zone covered by at least one sensor of an ADV, MTBF data of the sensor(s) covering the coverage zone is obtained. At block 620, a performance risk of each sensor is estimated (or computed) based on the MTBF data.

Figure 7:
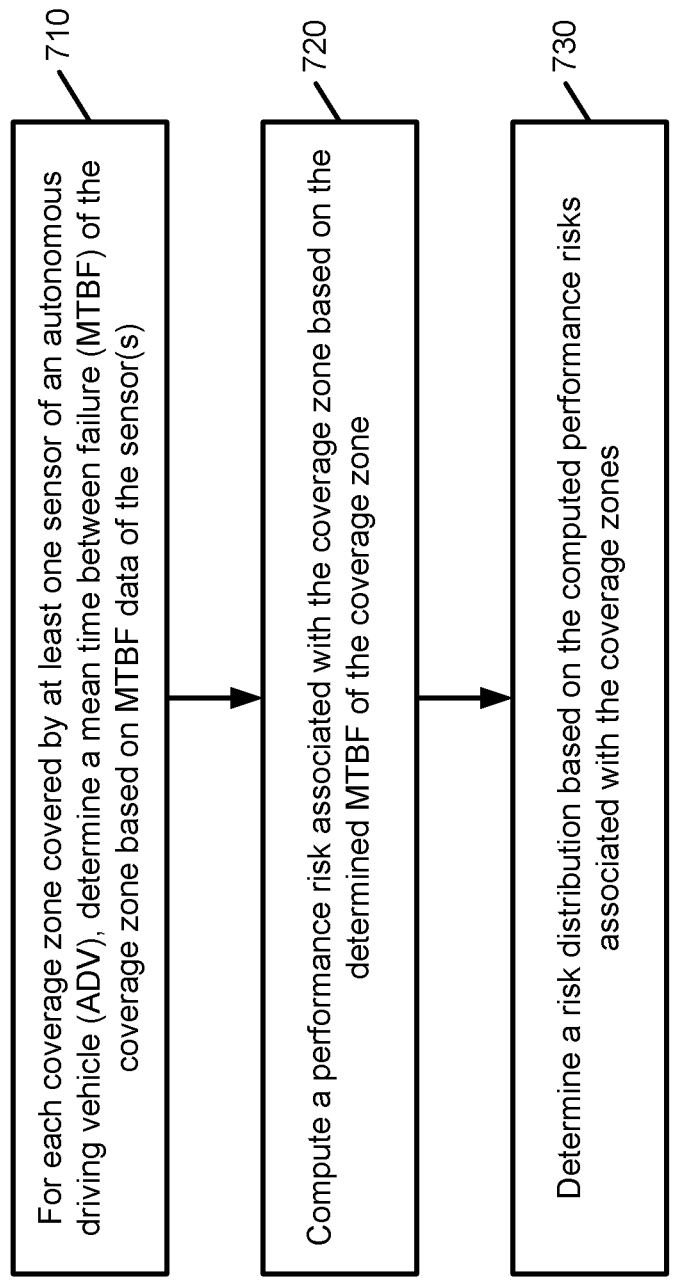
FIG. 7 is a flowchart illustrating an example method of generating a mapped risk distribution according to one embodiment.

FIG. 7 is a flowchart illustrating an example method of generating a mapped risk distribution according to one embodiment. Method 700 may be performed by hardware, software, or a combination of both. For example, method 700 may be performed by risk distribution generation module 309 of FIG. 3A.

Referring to FIG. 7, at block 710, for each coverage zone covered by at least one sensor of an ADV, a MTBF of the coverage zone is determined based on the MTBF data of the sensor(s). At block 720, a performance risk associated with the coverage zone is computed based on the determined MTBF of the coverage zone. At block 730, a risk distribution is determined based on the computed performance risks associated with the coverage zones.

Figure 8:
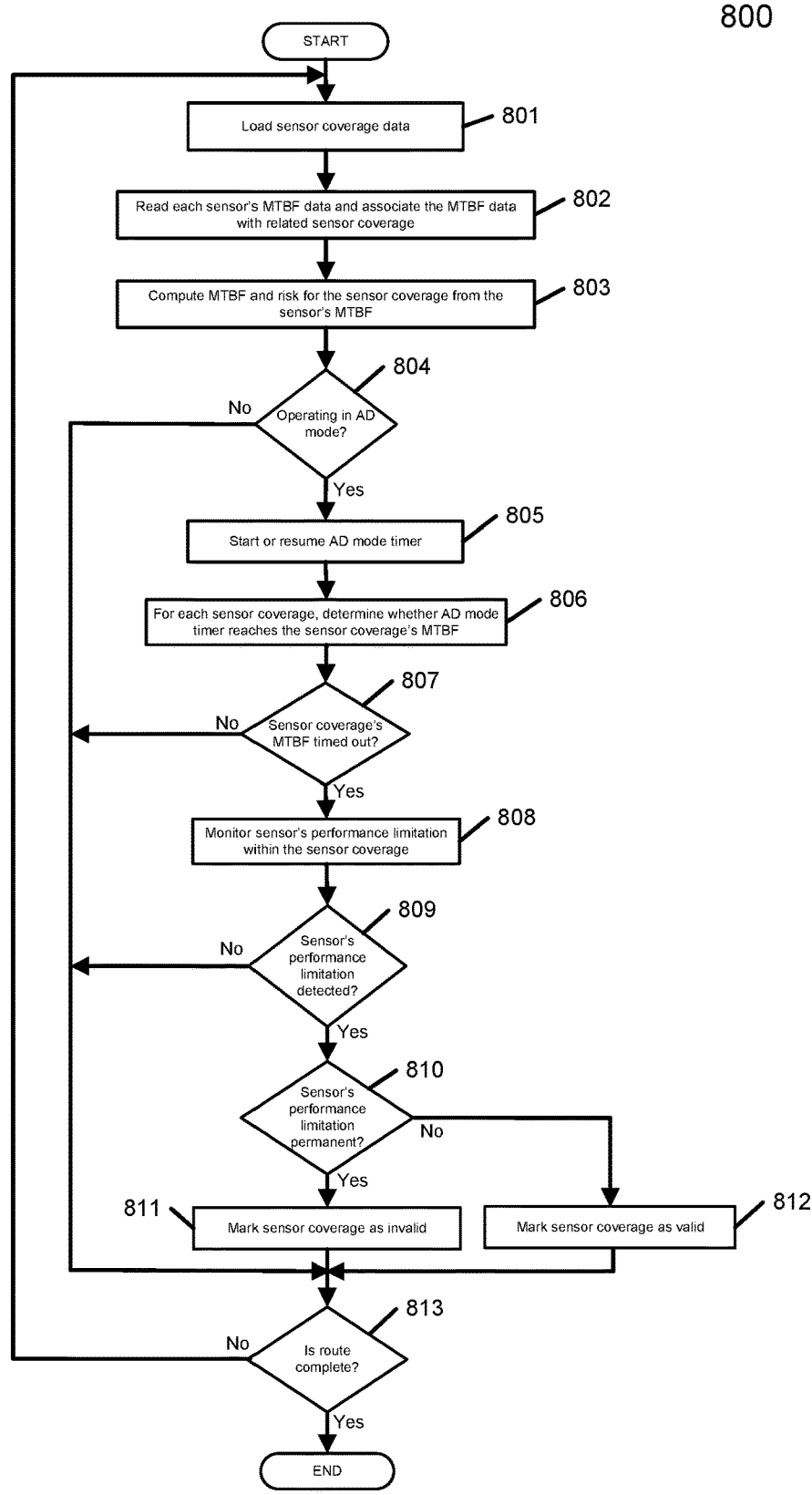
FIG. 8 is a flowchart illustrating an example method of computing and updating risk distribution within a sensor coverage according to one embodiment.

FIG. 8 is a flowchart illustrating an example method of computing and updating risk distribution within a sensor coverage according to one embodiment. Method 800 may be performed by hardware, software, or a combination of both. For example, method 800 may be performed by risk estimation module 308 and/or risk distribution generation module 309 of FIG. 3A.

Referring to FIG. 8, at block 801, sensor coverage data (e.g., aerial images, land cover data, digital elevation models, etc.) is loaded. In some embodiments, the sensor coverage data may be in the form of regular or irregular grids, point clouds, and/or meshes. At block 802, the MTBF data of each sensor is read and the MTBF data is associated with a related sensor coverage (or coverage zone). At block 803, the sensor coverage's MTBF and risk are computed from the sensor's MTBF data. At block 804, it is determined whether an autonomous driving vehicle (e.g., vehicle 101 of FIG. 1) is operating in AD mode. If so, at block 805, an AD mode timer is started or resumed if it has previously been started. Otherwise, method 800 proceeds to block 813. At block 806, for each sensor coverage, it is determined whether the AD mode timer reaches the sensor coverage's MTBF. At block 807, it is determined whether the sensor coverage's MTBF has timed out. If so, method 800 proceeds to block 808. Otherwise, method 800 proceeds to block 813. At block 808, the sensor's performance limitation within the sensor coverage is monitored. At block 809, it is determined whether the sensor's performance limitation is detected. If so, method 800 proceeds to block 810. Otherwise, method 800 proceeds to block 813. At block 810, it is determined whether the sensor's performance limitation is permanent. If so, method 800 proceeds to block 811 to mark the sensor coverage as invalid. Otherwise, method 800 proceeds to block 812 to mark the sensor coverage as valid. At block 813, it to determine whether the route is complete. If so, method 800 ends. Otherwise, method 800 returns to block 801.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
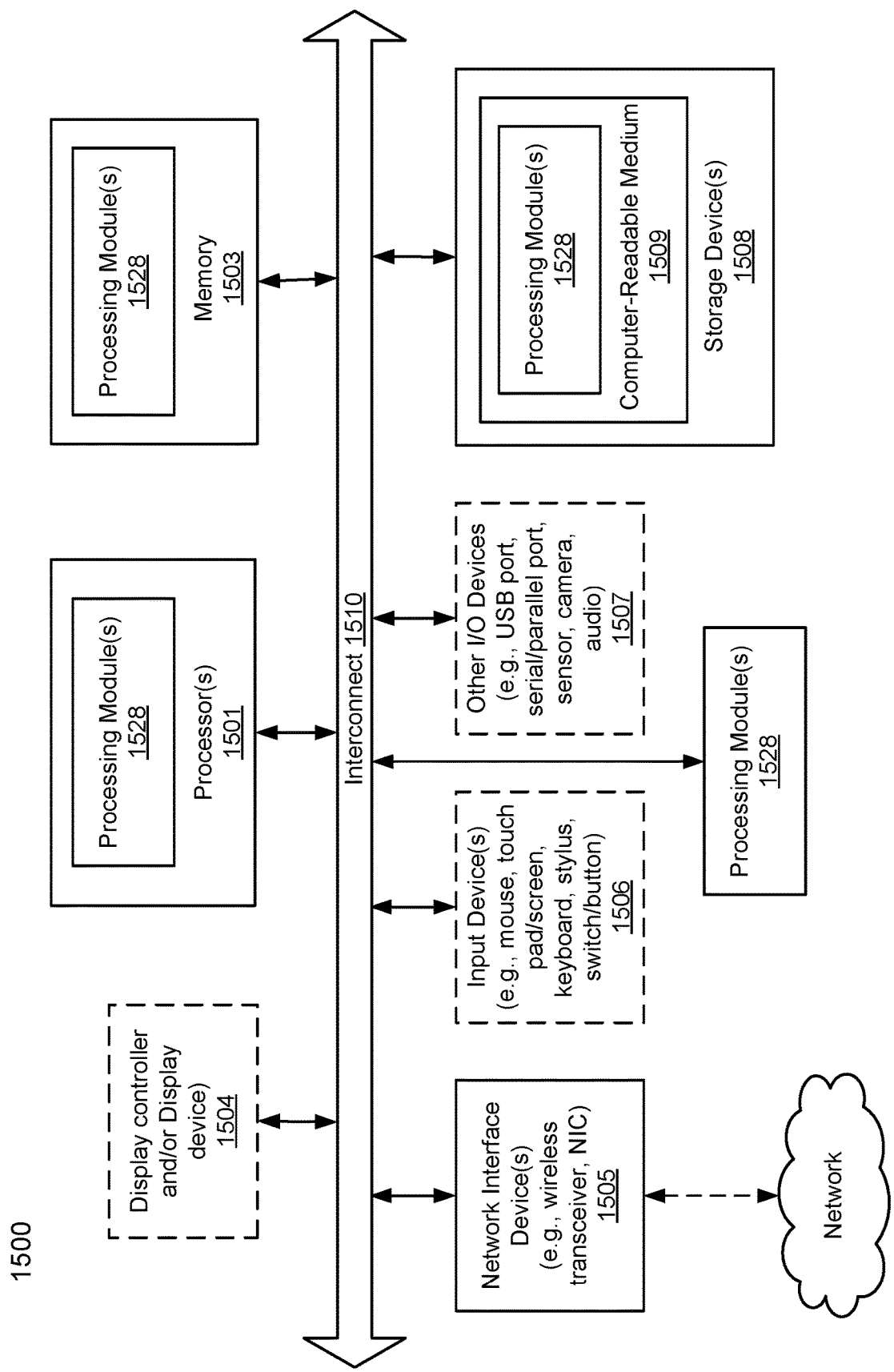
FIG. 9 is a block diagram illustrating a data processing system according to one embodiment.

FIG. 9 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, or any of systems 110-115 of FIG. 1. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, risk estimation module 308, and risk distribution generation module 309. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of operating an autonomous driving vehicle (ADV) having a plurality of sensors, the method comprising:

for each coverage zone covered by at least one sensor of the plurality of sensors of the ADV, wherein the at least one sensor comprises at least one of: a primary sensor communicating with a primary autonomous driving system (ADS) of the ADV, a redundant sensor communicating with a secondary ADS of the ADV, or a shared sensor communicating with the primary ADS and the secondary ADS, obtaining mean time between failure (MTBF) data of the at least one sensor covering the coverage zone, wherein the MTBF data of the at least one sensor includes information of an elapsed time between failures of the at least one sensor, determining an MTBF for the coverage zone based on the MTBF data of the at least one sensor, wherein the MTBF for the coverage zone represents the elapsed time between failures of the at least one sensor covering the coverage zone, and computing a performance risk associated with the coverage zone based on the determined MTBF for the coverage zone;

determining risk distributions based on the computed performance risks associated with the plurality of coverage zones;

controlling the ADV to move along a route in autonomous driving (AD) mode; and while controlling the ADV to move along the route in AD mode, for each coverage zone covered by the at least one sensor, starting an AD mode timer, and determining whether the AD mode timer reaches the MTBF for the coverage zone.

2. The method of claim 1, further comprising:

determining whether the MTBF for the coverage zone has timed out; and in response to determining that the MTBF for the coverage zone has timed out, monitoring performance limitation of the at least one sensor within the coverage zone.

3. The method of claim 2, further comprising:

determining whether the performance limitation of the at least one sensor is detected;

in response to determining that the performance limitation of the at least one sensor is detected, determining whether the performance limitation is permanent;

in response to determining that the performance limitation is permanent, marking the coverage zone as invalid;

otherwise, in response to determining that the performance limitation is not permanent, marking the coverage zone as valid.

4. The method of claim 1, wherein the performance risk associated with the coverage zone is a reciprocal of the MTBF for the coverage zone.

5. The method of claim 1, wherein the at least one sensor comprises a first sensor and a second sensor, and the MTBF for the coverage zone is a product of a MTBF of the first sensor and a MTBF of the second sensor.

6. The method of claim 1, wherein the at least one sensor comprises a 360-degree light detection and range (LIDAR) unit, a plurality of cameras, a plurality of side LIDAR units, a forward facing radar unit, a rear facing radar unit, and a redundant forward facing LIDAR unit, the plurality of cameras and the 360-degree LIDAR unit are only used by a primary autonomous driving system (ADS) of the ADV, the plurality of side LIDAR units and the forward and rear facing radar units are shared between the primary ADS and a secondary ADS of the ADV, and the redundant forward facing LIDAR unit is only used by the secondary ADS.

7. A non-transitory machine-readable medium having instructions stored therein, which when executed by a processor, cause the processor to perform operations, the operations comprising:

in a plurality of coverage zones covered by a plurality of sensors of an autonomous driving vehicle (ADV), for each coverage zone covered by at least one sensor of the plurality of sensors of the ADV, wherein the at least one sensor comprises at least one of: a primary sensor communicating with a primary autonomous driving system (ADS) of the ADV, a redundant sensor communicating with a secondary ADS of the ADV, or a shared sensor communicating with the primary ADS and the secondary ADS, obtaining mean time between failure (MTBF) data of the at least one sensor covering the coverage zone, wherein the MTBF data of the at least one sensor includes information of an elapsed time between failures of the at least one sensor, determining an MTBF for the coverage zone based on the MTBF data of the at least one sensor, wherein the MTBF for the coverage zone represents the elapsed time between failures of the at least one sensor covering the coverage zone, and computing a performance risk associated with the coverage zone based on the determined MTBF for the coverage zone;

determining risk distributions based on the computed performance risks associated with the plurality of coverage zones;

controlling the ADV to move along a route in autonomous driving (AD) mode; and while controlling the ADV to move along the route in AD mode, for each coverage zone covered by the at least one sensor, starting an AD mode timer, and determining whether the AD mode timer reaches the MTBF for the coverage zone.

8. The non-transitory machine-readable medium of claim 7, wherein the operations further comprise:

determining whether the MTBF for the coverage zone has timed out; and in response to determining that the MTBF for the coverage zone has timed out, monitoring performance limitation of the at least one sensor within the coverage zone.

9. The non-transitory machine-readable medium of claim 8, wherein the operations further comprise:

determining whether the performance limitation of the at least one sensor is detected;

in response to determining that the performance limitation of the at least one sensor is detected, determining whether the performance limitation is permanent;

in response to determining that the performance limitation is permanent, marking the coverage zone as invalid;

otherwise, in response to determining that the performance limitation is not permanent, marking the coverage zone as valid.

10. The non-transitory machine-readable medium of claim 7, wherein the performance risk associated with the coverage zone is a reciprocal of the MTBF for the coverage zone.

11. The non-transitory machine-readable medium of claim 7, wherein the at least one sensor comprises a first sensor and a second sensor, and the MTBF for the coverage zone is a product of a MTBF of the first sensor and a MTBF of the second sensor.

12. The non-transitory machine-readable medium of claim 7, wherein the at least one sensor comprises a 360-degree light detection and range (LIDAR) unit, a plurality of cameras, a plurality of side LIDAR units, a forward facing radar unit, a rear facing radar unit, and a redundant forward facing LIDAR unit, the plurality of cameras and the 360-degree LIDAR unit are only used by a primary autonomous driving system (ADS) of the ADV, the plurality of side LIDAR units and the forward and rear facing radar units are shared between the primary ADS and a secondary ADS of the ADV, and the redundant forward facing LIDAR unit is only used by the secondary ADS.

13. A data processing system, comprising:

a processor; and a memory coupled to the processor to store instructions, which when executed by the processor, cause the processor to perform operations, the operations including:

in a plurality of coverage zones covered by a plurality of sensors of an autonomous driving vehicle (ADV), for each coverage zone covered by at least one sensor of the plurality of sensors of the ADV, wherein the at least one sensor comprises at least one of: a primary sensor communicating with a primary autonomous driving system (ADS) of the ADV, a redundant sensor communicating with a secondary ADS of the ADV, or a shared sensor communicating with the primary ADS and the secondary ADS, obtaining mean time between failure (MTBF) data of the at least one sensor covering the coverage zone, wherein the MTBF data of the at least one sensor includes information of an elapsed time between failures of the at least one sensor, determining an MTBF for the coverage zone based on the MTBF data of the at least one sensor, wherein the MTBF for the coverage zone represents the elapsed time between failures of the at least one sensor covering the coverage zone, and computing a performance risk associated with the coverage zone based on the determined MTBF for the coverage zone;

determining risk distributions based on the computed performance risks associated with the plurality of coverage zones;

controlling the ADV to move along a route in autonomous driving (AD) mode; and while controlling the ADV to move along the route in AD mode, for each coverage zone covered by the at least one sensor, starting an AD mode timer, and determining whether the AD mode timer reaches the MTBF for the coverage zone.

14. The data processing system of claim 13, wherein the operations further include determining whether the AD mode timer reaches the MTBF for the coverage zone;

determining whether the MTBF for the coverage zone has timed out; and in response to determining that the MTBF of the coverage zone has timed out, monitoring performance limitation of the at least one sensor within the coverage zone.

15. The data processing system of claim 14, wherein the operations further include determining whether the performance limitation of the at least one sensor is detected;

in response to determining that the performance limitation of the at least one sensor is detected, determining whether the performance limitation is permanent;

in response to determining that the performance limitation is permanent, marking the coverage zone as invalid;

otherwise, in response to determining that the performance limitation is not permanent, marking the coverage zone as valid.

16. The data processing system of claim 13, wherein the performance risk associated with the coverage zone is a reciprocal of the MTBF for the coverage zone.

17. The data processing system of claim 13, wherein the at least one sensor comprises a first sensor and a second sensor, and the MTBF for the coverage zone is a product of a MTBF of the first sensor and a MTBF of the second sensor.

* * * * *